(12) United States Patent
Yan et al.

(10) Patent No.: US 9,465,184 B2
(45) Date of Patent: Oct. 11, 2016

(54) LENS MODULE

(71) Applicants: Junjie Yan, Shenzhen (CN); Chuandong Wei, Shenzhen (CN); Liangwei Wan, Shenzhen (CN); Chunhuan Fang, Shenzhen (CN); Lei Zhang, Shenzhen (CN)

(72) Inventors: Junjie Yan, Shenzhen (CN); Chuandong Wei, Shenzhen (CN); Liangwei Wan, Shenzhen (CN); Chunhuan Fang, Shenzhen (CN); Lei Zhang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/559,122

(22) Filed: Dec. 3, 2014

(65) Prior Publication Data
US 2015/0198777 A1    Jul. 16, 2015

(30) Foreign Application Priority Data

Jan. 13, 2014   (CN) .................... 2014 2 0019456 U

(51) Int. Cl.
*G02B 7/02* (2006.01)
*G02B 7/00* (2006.01)

(52) U.S. Cl.
CPC .............. *G02B 7/021* (2013.01); *G02B 7/003* (2013.01); *G02B 7/022* (2013.01)

(58) Field of Classification Search
CPC ....... G02B 7/021; G02B 7/022; G02B 7/003
USPC .................................. 359/793–795, 811, 819
See application file for complete search history.

(56) References Cited

U.S. PATENT DOCUMENTS

| | | | |
|---|---|---|---|
| 8,866,949 B2* | 10/2014 | Yano ........................ | B32B 37/12 348/294 |
| 2009/0015945 A1* | 1/2009 | Chen ....................... | G02B 7/021 359/819 |
| 2013/0038948 A1* | 2/2013 | Okai ..................... | B29C 66/5416 359/738 |
| 2013/0050850 A1* | 2/2013 | Lin ......................... | G02B 7/021 359/738 |

* cited by examiner

*Primary Examiner* — Darryl J Collins
(74) *Attorney, Agent, or Firm* — Na Xu; IPro, PLLC

(57) ABSTRACT

A lens module includes a lens holder having a top wall that has a bottom surface, and a lens unit received by the lens holder. The lens unit includes a first lens adjacent to the top wall and a second lens attached to the first lens. A first complementary configuration is arranged between the first lens and the top wall of the lens holder for ensuring a concentricity between the lens unit and the lens holder, and a second complementary configuration is arranged between the first lens and the second lens for ensuring a concentricity between the first lens and the second lens.

15 Claims, 4 Drawing Sheets

LENS MODULE

FIELD OF THE INVENTION

The present invention relates to optical apparatuses, and more particularly to a lens module used in a camera or other image pick-up device.

DESCRIPTION OF RELATED ART

With the rapid development of technologies, electronic devices having image pick-up functions, such as cameras, mobile phones, portable computers, tablets, are equipped with lens modules. For satisfying the demands of high quality pictures, lens modules are designed and manufactured with high precisions. As one of the key characters of a lens module, concentricity is much important for performing high quality pictures.

Generally, a lens module includes a holder for receiving a plurality of lens units therein. The lens units should be provided with high concentricity to be concentric with each other, and the combination of the lens unit should be concentric with the holder. During actual manufacturing process, the concentricity between the lens units, or between the lens unit and the holder is difficult to be controlled. Thus, this disclosure provides a lens module provided with special configuration for ensuring the concentricity thereof.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment.

Figure 1:
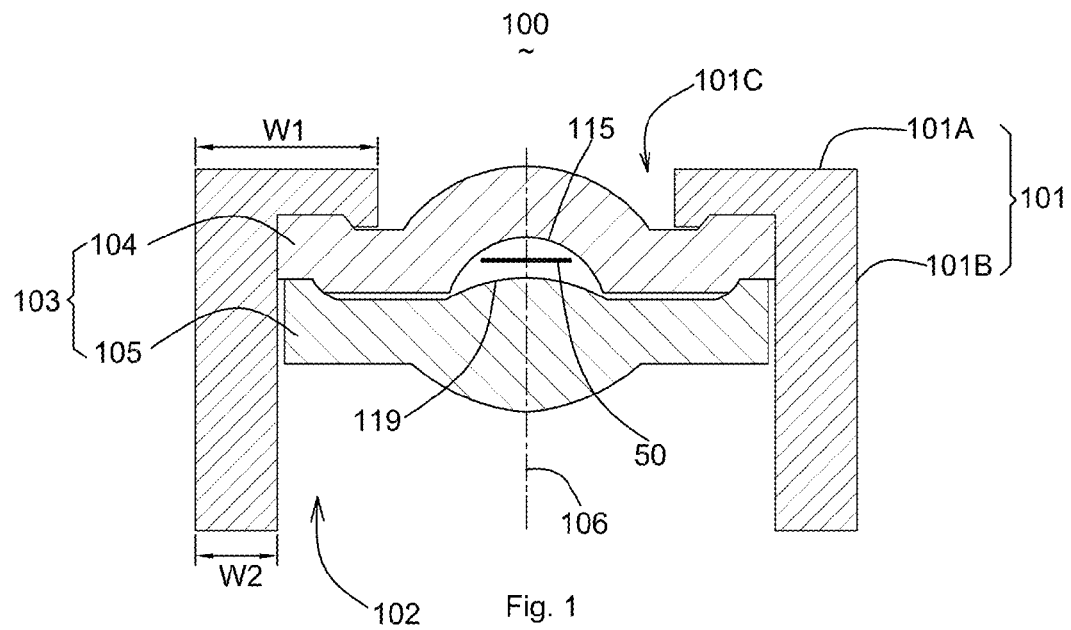
FIG. 1 is an illustrative cross-sectional view of a lens module in accordance with an exemplary embodiment of the present disclosure.
Figure 2:
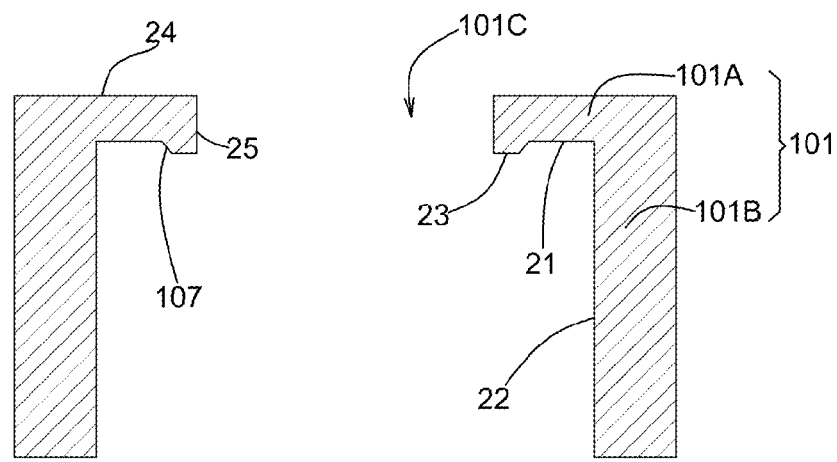
FIG. 2 is an illustrative cross-sectional view of a lens holder of the lens module in FIG. 1.

The present disclosure provides a lens module that could be used in a mobile phone, a tablet, or a digital camera. Referring to FIGS. 1-2, a lens module 100 includes a lens holder 101 and a lens unit 103 supported by the lens holder 101. The lens module has an optic axis 106. The lens holder 101 is symmetric about the optic axis 106, and comprises a first holder 101A and a second holder 101B extending vertically from an edge of the first holder 101A. In this embodiment, the second holder 101B is integrated with the first holder 101A. Along a direction perpendicular to the optic axis 106, a first thickness W1 of the first holder 101A is greater than a second thickness W2 of the second holder 101B. The first holder 101A includes a top surface 24, a first bottom surface 21 opposed and parallel to the top surface 24, a second bottom surface 23 parallel to the first bottom surface 21, a first bevel 107 connecting the first bottom surface 21 and the second bottom surface 23, and a first inner surface 25 connecting the top surface 24 and the second bottom surface 23. The first bevel 107 forms an angle relative to the optic axis. The first inner surface 25 forms an aperture 101C for passing lights into the holder. The first bevel 107 extends from the first bottom surface 21 to the second bottom surface 23 along a direction closer to the optic axis 106, thus the first holder 101A has a thickness adjacent the aperture 101C greater than a thickness away from the aperture 101C. The second holder 101B includes a second inner surface 22 jointing with and perpendicular to the first bottom surface 21 of the first holder 101A. The second inner surface 22, the first bottom surface 21, the first bevel 107, and the second bottom surface 23 cooperatively form a receiving space 102 for receiving the lens unit 103. The lens unit 103 includes a first lens 104 and a second lens 105 attached to the first lens 104. The first lens 104 locates between the first holder 101A and the second lens 105.

Figure 3:
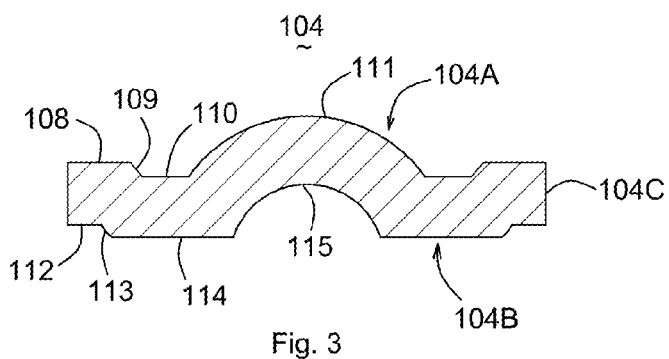
FIG. 3 is an illustrative cross-sectional view of a first lens used in the lens module in FIG. 1.
Figure 4:
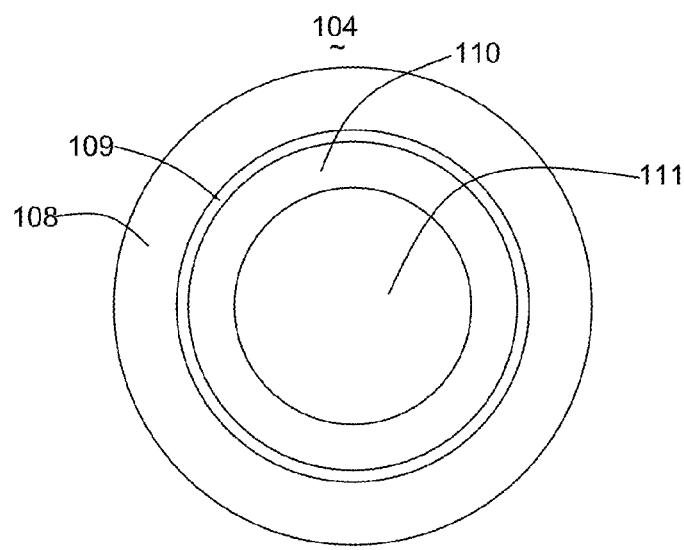
FIG. 4 is a top view of a first surface of the first lens.
Figure 5:
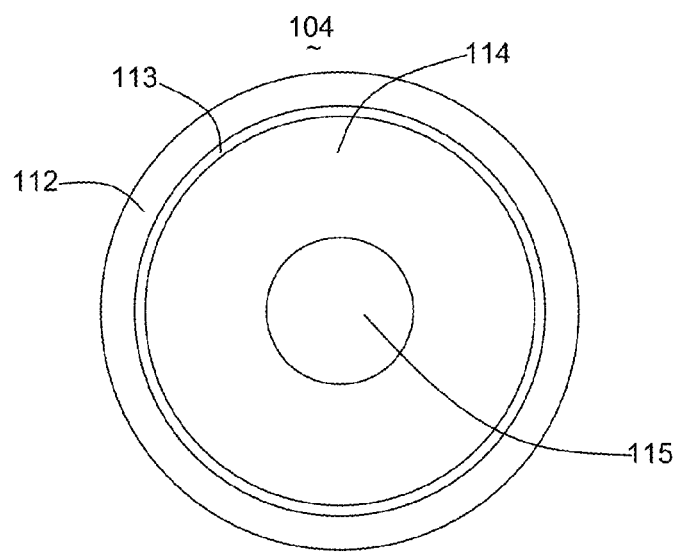
FIG. 5 is a bottom view of a second surface of the first lens.

Referring to FIGS. 3-5, the first lens 104 includes a first object-side surface 104A and an image-side surface 104B opposed to the first object-side surface 104A. A distance between the first object-side surface 104A and the first image-side surface determines a thickness of the first lens 104. The first object-side surface 104A comprises, from a periphery to a center, a first plane 108, a second bevel 109 connecting with the first plane 108, a second plane 110 connecting with the second bevel 109, and a first optic surface 111 connecting with the second plane 110. The second bevel 109 extends from the first plane 108 to the second plane 110 along a direction toward the center of the first lens 104, thus the second plane 110 is closer to the first image-side surface 104B than the first plane 108. The second bevel 109 forms an angle relative to the optic axis same to the first bevel. Each of the first and second planes 108, 110 is perpendicular to the optic axis.

The image-side surface 104B comprises, from the periphery to the center, a third plane 112 perpendicular to the optic axis, a first arc surface 113 connecting with the third plane 112, a fourth plane 114 connecting with the first arc surface 113 and perpendicular to the optic axis, and a second optic surface 115 connecting with the fourth plane 114. By virtue of the arc surface 113, the fourth plane 114 is farther away from the first object-side surface 104A than the third plane 112.

Figure 6:
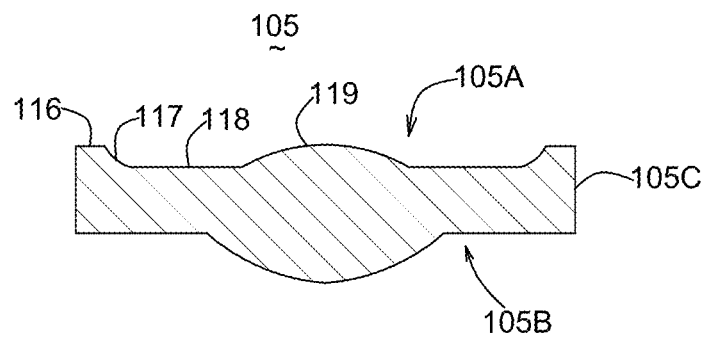
FIG. 6 is an illustrative cross-sectional view of a second lens used in the lens module in FIG. 1.
Figure 7:
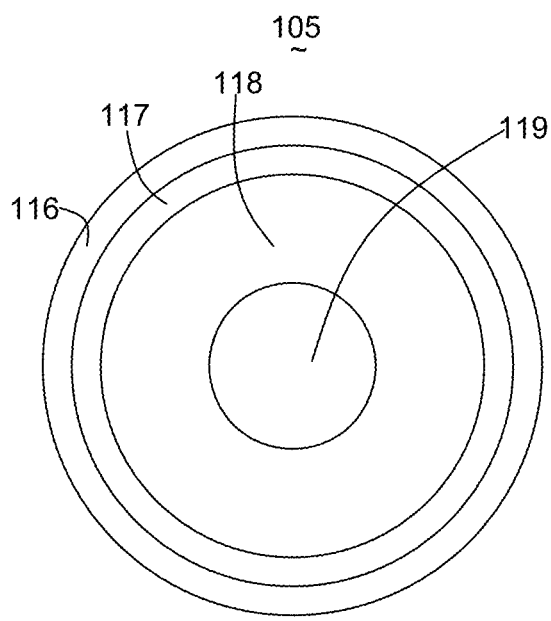
FIG. 7 is a top view of an upper surface of the second lens.

Referring to FIGS. 6-7, the second lens 105 comprises a second object-side surface 105A and a second image-side surface 105B opposed to the second object-side surface 105A. A distance between the second object-side surface 105A and the second image-side surface 105B determines a thickness of the second lens 105. The second object-side surface 105A comprises, from a periphery to a center, a first carrying surface 116 perpendicular to the optic axis, a second arc surface 117, a second carrying surface 118 perpendicular to the optic axis, and a third optic surface 119. By virtue of the second arc surface 117, the second carrying surface 118 is closer to the second image-side surface 105B than the first carrying surface 116.

Figure 8:
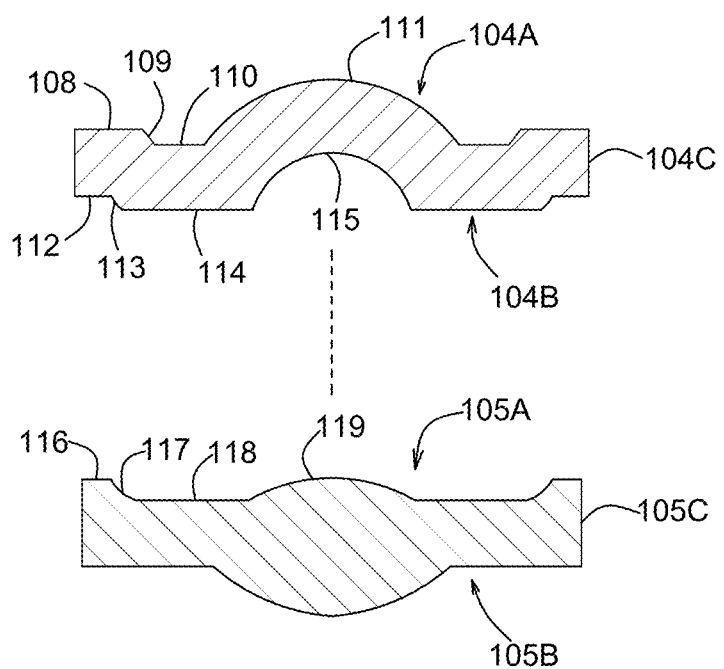
FIG. 8 is an illustrative view of the first lens ready to be attached to the second lens.

Referring to FIG. 8, and also referring to FIG. 1, while assembled, the third plane 112 abuts against the first carrying surface 116, the first arc surface 113 abuts against the second arc surface 117, and the fourth plane 114 spaces from the second carrying surface 118. In addition, a space is accordingly formed between the second optic surface 115 and the third optic surface 119 for placing a filter 50 therebetween.

Referring back to FIG. 1, also referring to FIGS. 2-8, when the combination of the first lens 104 and the second lens 105 is assembled with the lens holder 101, the first plane 108 abuts against the first bottom surface 21 of the first holder 101A, the second bevel 108 abuts against the first bevel 107, and the side surface 104C abuts against the second inner surface 22 of the second holder 101B. Be noted that the jointing surface 105C keeps a distance from the second inner surface 22 of the second holder 101B.

The cooperation or engagement between the first arc surface 113 and the second arc surface 117 ensures the concentricity between the first lens 104 and the second lens 105, and the engagement between the first bevel 107 and the second bevel 109 ensures the concentricity between the combination of the first and second lenses and the lens holder 101. The engagement between the side surface 104C and the second inner surface 22 further ensure the concentricity between the combination and the lens holder 101. Since the jointing surface 105C of the second lens does not engage with the second inner surface 22 of the second holder 101B, the concentricity between the combination and the lens holder 101 is determined solely by the engagement between the first lens 104 and the lens holder 101, which reduces the assembling tolerance and improves the assembling precision. And, the concentricity between the first lens 104 and the second lens 105 is solely determined by the engagement between the first arc surface 113 and the second arc surface 117. Another word, the first arc surface 113 of the first lens and the second arc surface 117 of the second lens define a first assembling precision, and the first bevel of the lens holder and the second bevel of the first lens defines a second assembly precision. The first assembly precision ensures the concentricity between the first lens and the second lens, and the second assembly precision ensures the concentricity between the combination of the first and second lenses and the lens holder.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module, comprising:
a lens holder comprising a receiving space formed by an inner surface, a first bottom surface, a second bottom surface, and a first bevel connecting the first and second bottom surfaces;
a lens unit comprising:
a first lens having a first object-side surface, a first image-side surface, and a side surface connecting the first object-side surface to the first image-side surface, the first object-side surface comprising a first plane corresponding to the first bottom surface of the lens holder, and a second bevel abutting against the first bevel of the lens holder; the first image-side surface comprising a third plane, a first arc surface connecting to the third plane, and a fourth plane connecting with the first arc surface, and a second lens having a second object-side surface, a second image-side surface, and a jointing surface connecting the second object-side surface to the second image-side surface; the second object-side surface including a first carrying surface abutting against the third plane of the first lens, a second arc surface engaging with the first arc surface of the first lens, and a second carrying surface corresponding to the fourth plane of the first lens;
wherein the side surface of the first lens engages with the inner surface of the lens holder.

2. The lens module as described in claim 1, wherein the first plane of the first lens abuts against the first bottom surface of the lens holder.

3. The lens module as described in claim 1, wherein the second carrying surface of the second lens keeps a distance from the fourth plane of the first lens.

4. The lens module as described in claim 3 further including a filter located between the second carrying surface and the fourth plane.

5. The lens module as described in claim 1, wherein the jointing surface of the second lens keeps a distance from the inner surface of the lens holder.

6. The lens module as described in claim 1, wherein the lens holder comprising a first holder and a second holder extending vertically from a periphery of the first holder.

7. A lens module, comprising:
a lens holder defining an optic axis, the lens holder including a first bottom surface perpendicular to the optic axis, a second bottom surface parallel to the first bottom surface, and a first bevel obliquely extending from the first bottom surface to the second bottom surface;
a lens unit comprising a first lens and a second lens;
the first lens including a second bevel located on a surface adjacent to the bottom surfaces of the lens holder and engaging with the first bevel, and a first arc surface located on a surface far away from the bottom surfaces;
the second lens including a second arc surface engaging with the first arc surface of the first lens;
a first assembly precision defined by the first bevel of the lens holder and the second bevel of the first lens for ensuring a concentricity between the lens unit and the lens holder; and
a second assembly precision defined by the first arc surface and the second arc surface for ensuring a concentricity between the first lens and the second lens,
wherein the lens holder including an inner surface perpendicular to the optic axis for abutting against a side surface of the first lens.

8. The lens module as described in claim 7, wherein the lens holder comprising a first holder having a first thickness along a direction perpendicular to the optic axis, and a second holder having a second thickness along the direction, the first thickness being greater than the second thickness.

9. The lens module as described in claim 7 further including a filter located between the first lens and the second lens.

10. The lens module as described in claim 7, wherein the second lens includes a jointing surface keeping a distance from the inner surface of the lens holder.

11. A lens module, comprising:
a lens holder including a sidewall having an inner surface and a top wall extending from a top of the sidewall, the top wall having a bottom surface;
a receiving space formed by the inner surface of the sidewall and the bottom surface of the top wall;

a lens unit accommodated in the receiving space, the lens unit including a first lens adjacent to the top wall and a second lens attached to the first lens, the first lens including a first object-side surface and a first image-side surface, the second lens including a second object-side surface adjacent to the first object-side surface and a second image-side surface opposed to the second object-side surface;

a first complementary configuration arranged between the first lens and the top wall of the lens holder for ensuring a concentricity between the lens unit and the lens holder, and a second complementary configuration arranged between the first lens and the second lens for ensuring a concentricity between the first lens and the second lens, wherein the first lens further includes a side surface abutting against the inner surface of the sidewall of the lens holder.

12. The lens module as described in claim 11, wherein the first complementary configuration includes a first bevel disposed on the bottom surface of the top wall and a second bevel disposed on the first object-side surface.

13. The lens module as described in claim 11, wherein the second complementary configuration includes a first arc surface on the first image-side surface of the first lens and a second arc surface on the second object-side surface.

14. The lens module as described in claim 11, wherein the second lens further includes a jointing surface parallel to the side surface of the first lens and keeping a distance from the inner surface of the sidewall.

15. The lens module as described in claim 11 further comprising a gap between the first image-side surface and the second object-side surface.

* * * * *